United States Patent Office 3,475,339
Patented Oct. 28, 1969

3,475,339
AQUEOUS DISPERSION OF PHOTOCHROMIC MERCURIC COMPLEXES OF DIARYL THIOCARBAZONES AND DYEING PROCEDURE EMPLOYING SAME
Walter Henry Foster, Jr., Freehold, John Mark Dowd, Jr., Hillsborough Township, Somerset County, and Ralph Arthur Coleman, Middlesex, N.J., assignors to American Cyanamid Company, Stamford, Conn., a corporation of Maine
No Drawing. Filed Aug. 17, 1965, Ser. No. 480,520
Int. Cl. G02b; F21v 9/00; G03c 1/52
U.S. Cl. 252—300
9 Claims

ABSTRACT OF THE DISCLOSURE

Polymeric substrates are rendered photochromic by treatment with an aqueous dispersion of a mercuric complex of a diaryl thiocarbozone, such as methyl [(phenylazo)thioformic acid 2-phenylhydrazidato] mercury; said dispersion comprising a water-miscible solvent for the mercuric complex, water, and an anionic or nonionic surfactant.

This invention relates to an improved procedure for rendering polymeric materials photochromic. More particularly, it relates to an improved method of applying compositions containing mercuric complexes of diaryl thiocarbazones to polymeric substrates.

In application Ser. No. 448,274, filed Apr. 15, 1965, is disclosed a class of photochromic compounds and certain stabilized compositions thereof. Other photochromic mercury complexes are disclosed in application Ser. No. 323,580, filed Nov. 14, 1963, and now abandoned. A variety of methods is disclosed for incorporating or applying these compounds and compositions into or on polymeric substrates. Included are blending with a polymerizable monomer prior to polymerization, coating by spraying or padding solutions of the photochromic compound and hot milling the photochromic compound with particles of the polymeric material.

These methods may involve one or more of the following difficulties. Solutions of the photochromic compounds when exposed in an open dyeing vat, or when being sprayed, give off toxic vapors. High temperatures are required during the step of milling the photochromic compound into the polymeric material and this may have an adverse effect upon the photochromic compound. When it is desired to apply the photochromic material to a glossy surface of an optically useful object, the surface is usually impaired for optical purposes.

In view of these difficulties, it is an object of the present invention to provide an improved method of applying photochromic compositions to polymeric materials. Other objects will be apparent from the ensuing description of the invention.

By the process of this invention, a polymeric substrate can be rendered photochromic by treatment with an aqueous dispersion of one of the aforementioned photochromic mercuric complexes.

The dispersion is prepared by dissolving a mercuric complex of a diaryl thiocarbazone in a water-miscible solvent and vigorously stirring the solution into water. A surface active agent should be present in at least one of the liquids in order to obtain dispersions which remain stable and homogeneous throughout the dyeing operation.

The polymeric substrate can be treated in any stage of fabrication. It can be in particulate form (i.e., pellet or chip form) which will be subsequently molded or extruded, or in fiber, film or sheet form. Also shaped objects such as lenses can be dyed. The present invention is particularly useful for dyeing shaped objects such as lenses and the like, since dyeing can be effected with very little damage to existing surface glossiness. In other words, an optically useful colorless lens can be treated with very little impairment to its optical value.

Polymers of many different chemical classes may be treated in accordance with this invention. Representative substrates which may be dyed by the procedure of this invention, i.e., the substrates to which the mercuric complexes are substantive, include cellulose esters such as cellulose acetate, cellulose acetate-butyrate and cellulose triacetate; poly(acrylonitrile); polyesters; linear superpolyamides such as nylon, silk, and wool; poly(allyl diglycol carbonate), copolymers of acrylonitrile and vinyl chloride; poly(vinyl chloride); poly(vinyl butyral); poly-(vinylidene chloride); etc. More complete listings of useful polymers are disclosed in the above-mentioned applications, to which reference is hereby made.

As solvents which are both fully water-miscible and capable of dissolving the photochromic mercuric complexes, there may be named acetone, ethylene glycol, 2-ethoxyethanol, diethylene glycol, diethylene glycol monobutyl ether, methanol, ethanol, isopropanol and other alkanones, glycols, ethers and alkanols possessing the required solubility and solvent properties.

Between 50 and 8,000 parts of solvent per part of mercuric complex are preferred. The solution may be prepared at an elevated temperature, i.e., up to the boiling point of the solvent, but not over 160° C. Between 50 and 10,000 parts of water per part of mercuric complex are preferred.

Superior dispersions are formed when the organic solvent and/or the water contain anionic and/or nonionic surface active agents.

The mercury compounds are compatible with all types of known nonionic and anionic surfactants.

Organic anionic surfactants which may be employed include the surface-active alkali metal sulfonates and sulfates. A type within this class is the long chain alkylarylsulfonates, i.e., those wherein the alkyl group is straight or branched and contains from 8–22 carbon atoms, but preferably 10–16 carbon atoms, examples of which are octyl, decyl, dodecyl, pentadecyl, hexadecyl, octadecyl, mixed long chain alkyls derived from long chain fatty acids such as the lauryl radical, cracked paraffin wax olefins, polymers of low mono-olefins such as the propylene tetramer, and the like; and wherein the aryl radical is derived from benzene, toluene, xylene, phenol, the cresols, naphthalene and the like. Specific examples of these comprise sodium decylbenzenesulfonate, sodium dodecylbenzenesulfonate, sodium laurylbenzenesulfonate, and sodium hexadecylbenzenesulfonate. Other sulfonate surface active agents are contemplated also, as, for example, the long chain alkyl sulfonates such as sodium hexadecanesulfonate and sodium octadecanesulfonate.

The anionic sulfate detergents having 12–26 carbon atoms, particularly those having an alkyl radical of about 18–22 carbon atoms, may be employed herein. These include sulfuric acid esters of polyhydric alcohols incompletely esterified with fatty acids, e.g., sodium coconut oil monoglyceride monosulfate and sodium tallow diglyceride monosulfate, the pure and mixed alkyl sulfates, and higher sulfates such as sodium lauryl sulfate and sodium cetyl sulfate.

Additional anionic surface active sulfonates and sulfates contemplated by this invention are the sulfonated and sulfated alkyl acid amides and sulfated and sulfonated esters, the sodium salt of a sulfonic acid derivative of a dialkyl dicarboxylate, sodium sulfo-succinated amides such as $NaOOC-CH_2-CH(SO_3Na)CONHC_{18}H_{37}$, and the like.

In addition to anionic surface active agents, nonionic surface active agents are useful in the compositions of this invention. Nonionic surface active agents which may be used are generally viscous, wax-like, water-soluble surface active substances containing a polyglycol ether group. These nonionic detergents are well-known (e.g., U.S. 1,970,578 and U.S. 2,213,477) and may be typified by polyalkylene oxide derivatives (e.g., polyethylene oxide, polypropylene oxide, polybutylene oxide) of water-insoluble higher fatty acids, such as lauric, oleic, palmitic and stearic, and the like. Alkylene oxide derivatives of such water-insoluble organic hydroxy compounds as the fatty alcohols, phenols (particularly those having alkyl groups such as isooctyl-, t-butyl-, triisopropyl-, nonyl-, dodecyl- or octadecylphenol), or aralkyl alcohols (e.g., benzyl alcohol) and the like are likewise useful. They may also be exemplified by the polyalkylene oxide derivatives of such amines as stearyl, lauryl, dicyclohexyl, dibutylamine, and the like.

A mixture of an anionic and a nonionic surface active agent may be used in preparing the mercuric complex dispersion used in this invention.

The dyebaths (dispersions) can have a temperature between 40° and 100° C. The maximum temperature will depend on the softening or distortion temperature of the substrate to be dyed. Dyeing near the maximum temperature is usually desirable for shortest dyeing time. Contact time between the substrate and dyebath will depend on several factors, such as substantivity of the mercuric complexes for the substrate, temperature of the dyebath, solvents, dispersing agents, and substrate used, including its physical form.

The dyed substrates may be washed and rinsed with water to remove superficial amounts of dye dispersion, followed by drying at a temperature below the softening or distortion temperature of the substrate.

The mercuric complexes which are useful in practicing the present invention are represented by the following formulae:

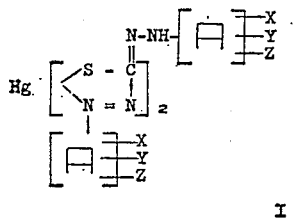

I

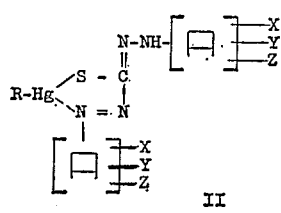

II and

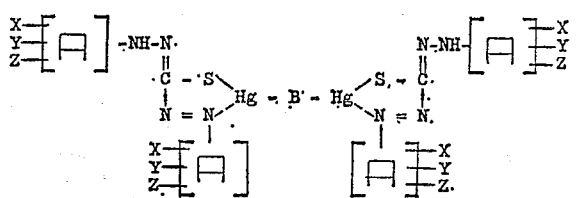

III wherein X, Y and Z are intended to represent either hydrogen, a lower alkyl radical, hydroxy, a lower alkoxy radical, a halo radical, a nitro radical, an amino radical, a di-lower alkylamino radical or a phenylazo radical. The symbol R is intended to reperesent an alkyl radical of up to eighteen carbon atoms (including cycloalkyl of five or six carbon atoms), an alkenyl radical of 2–10 carbon atoms, an aralkyl radical, especially monocyclic ar(lower alkyl) (such as benzyl or phenethyl), an aryl radical such as phenyl, biphenylyl, naphthyl or a heterocyclic aromatic radical having five or six ring members such as furyl and pyridyl. The symbol B is intended to represent a divalent organic linkage such as an alkylene radical of 2–10 carbon atoms or an arylene radical such as phenylene. The symbol

is intended to represent an aryl radical such as phenyl or naphthyl. The compounds of Formulae I, II and III may bear inert substituents and still be within the scope of the present invention. For example, R can be substituted by hydroxy, lower alkoxy, di-lower alkylamino, carbamoyl, halo, trifluoromethyl, nitro, carboxy, carb-lower alkoxy or lower alkanoyl. The radical B can likewise bear substituents such as those optionally found on radical R.

Along with the photochromic compounds of Formulae I, II and III, there may be added to the dispersion other materials such as dyestuffs which are not themselves photochromic. For example, a blue dyestuff and a mercuric dithizonate give a green color mixture before exposure to light.

To improve the stability of the photochromic complexes, antioxidants may also be used in conjunction with the photochromic material. These may be selected from the following classes of compounds:

(A) Antioxidants of the hindered phenol type including those having one to three phenolic groups. By "hindered phenol" is meant a phenol to which in either one or both of the ortho positions to the hydroxyl group is attached at least one bulky group, for example t-butyl. Specific examples of the antioxidants are the following:

2,6-di-tert-butyl-4-methylphenol
2,4,6-tri-tert-butylphenol
4,4'-thiobis(6-tert-butyl-m-cresol)
4,4'-methylenebis(2,6-di-tert-butylphenol)
4,4'-methylenebis(6-tert-butyl-m-cresol)
2,6-bis(2-hydroxy-3-t-butyl-5-methylbenzyl)-p-cresol
2,2'-methylenebis(4-ethyl-6-tert-butylphenol)
2,2'-methylenebis(4,6-dinonylphenol)
2,2'-methylenebis(4-methyl-6-tert-butylphenol)
4,4'-butylidenebis(6-tert-butyl-m-cresol)

(B) Antioxidants of the thio type as exemplified by dilauryl thiodipropionate. These may be defined more broadly by the formula:

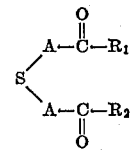

IV wherein $R_1$ and $R_2$ are substituents selected from the group consisting of —OH,

and —$OR_5$ wherein $R_3$ and $R_4$ are substituents selected from the group consisting of hydrogen and lower alkyl radicals having 1–6 carbon atoms and $R_5$ is an alkyl radical having from 4–18 carbon atoms, and A is an alkylene radical containing from 1–3 carbon atoms.

Illustrative thio compound within the general Formula IV are alkyl esters of 3,3'-thiodipropionic acid, wherein the alkyl group has 4–18 carbon atoms, such as dibutyl, diamyl, dihexyl, dioctyl, diisooctyl, di-2-ethylhexyl, dilauryl, distearyl, lauryl stearyl, and mixtures of these.

(C) Antioxidants of the phosphite type exemplified by trialkyl phosphites where the alkyl radical has from one to twenty carbon atoms, such as triisodecyl phosphite, trioctyl phosphite; mixed aryl alkyl phosphites such as phenyl diecyl phosphite, diphenyl decyl phosphite; and triaryl phosphites such as tris(p-nonylphenyl)phosphite.

The amount of antioxidant used is between 0.1% and 5.0%, preferably between 0.5% and 2.0%, based on the weight of the substrate.

An even greater degree of stability can be imparted to the photochromic complexes if the antioxidants are employed in conjunction with an ultraviolet light absorber, although the latter may be used alone. When both additives are used, photochromicity is often retained for periods which are greater than when either additive is used exclusively.

As ultraviolet absorbers which may be added to obtain maximum periods of stability, the following may be mentioned as illustrative.

(A) 2 - hydroxybenzophenones: 2 - hydroxy - 4 - methoxybenzophenone, 2,4 - dihydroxybenzophenone, 2,2'-dihydroxy - 4 - methoxybenzophenone, 2,2',4,4'-tetrahydroxybenzophenone, 2,2' - dihydroxy - 4,4' - dimethoxybenzophenone, 2 - hydroxy - 4 - butoxybenzophenone, 2 - hydroxy - 4 - octyloxybenzophenone, 2 - hydroxy-4 - dodecyloxybenzophenone, 2,2' - dihydroxy - 4 - octyloxybenzophenone, 4' - chloro - 2 - hydroxy - 4 - octyloxybenzophenone, etc.

(B) Benzotriazoles: 2 - (2 - hydroxy - 5 - methylphenyl)benzotriazole, 2 - (2 - hydroxy - 5 - octylphenyl) benzotriazole, 2 - (2 - hydroxy - 4 - methoxyphenyl) benzotriazole, etc.

(C) Esters: Phenyl salicylate, tertiary - butylphenyl salicylate, phenyl resorcylate, p-octylphenyl benzoate, bis(p - nonylphenyl)isophthalate, bis(p - nonylphenyl) terephthalate, etc.

(D) Triazines: 2,4,6 - tris(2-hydroxy - 4 - octyloxyphenyl) - s - triazine, 2 - (2 - hydroxy - 4 - octyloxyphenyl) - 4,6 - dixylyl - s - triazine, etc. These compounds are the subject of U.S. Patent 3,118,887, issued Jan. 21, 1964, to Hardy et al.

(E) Benzothiazoles: 2 - (4 - methoxyphenylimino)-3-ethylbenzothiazole, 2 - phenylimino - 3 - ethylbenzothiazole, etc.

(F) Benzylidenemalonic esters: Diethyl p - methoxybenzylidenemalonate, diethyl o - methoxybenzylidenemalonate, diethyl p - hydroxybenzylidenemalonate, diethyl diphenylmethylenemalonate, etc. This class of ultraviolet absorbers is disclosed in copending application of Susi, Ser. No. 362,182, filed Apr. 23, 1964, and now abandoned.

(G) Arylaminoethylenes: N - methyl - p - methoxyanilinomethylenemalonitriles disclosed in U.S. Patent 3,079,366.

The amount of ultraviolet absorber should be between 0.05 and 5.0% preferably between 0.2 and 2.0%, based on the weight of the polymeric substrate.

This invention is illustrated in the following examples.

EXAMPLE 1

This example shows the dyeing of representative mercuric complexes of diaryl thiocarbazones on a wide vairety of fabrics from aqueous dispersions. The following complexes were used:

Compound A

Methyl[(phenylazo)thioformic acid 2-phenylhydrazidato]mercury.

Compound B 2-hydroxyethyl[(phenylazo)thioformic acid 2-phenylhydrazidato]mercury.

Compound C

Bis[(phenylazo)thioformic acid 2-phenylhydrazido] mercury.

The mercuric complexes were applied from two types of baths.

Bath A

A 250 mg. sample of the mercuric complex was dissolved in 50 ml. of acetone. To the solution there was added 1.0 g. of sodium lauryl sulfate. The solution was then poured into 2,000 g. warm water (about 50° C.).

Bath B

A 250 mg. sample of the mercuric complex was dissolved in 200 ml. ethylene glycol. Where necessary to obtain a complete solution, a small amount of acetone was added. To the solution there was added 5 g./l. solution of a condensation product of nonylphenol and about 9.5 moles of ethylene oxide. The solution was poured into 1,800 ml. water containing 1.0 g. of sodium lauryl sulfate. The water was vigorously stirred during the pouring operation. The baths were heated to a temperature of 70–90° C. and samples of multi-fiber fabric were immersed in the baths for about ten minutes. The fabric samples were then washed with water and dried. The relative strengths of the dyeings were then estimated visually by comparing the color intensities.

The qualitative results are shown in Table I.

TABLE I

| Fiber | Bath A | | | Bath B | |
|---|---|---|---|---|---|
| | Compound A | Compound B | Compound C | Compound A | Compound C |
| Cellulose acetate | Heavy | V. Heavy | Negligible | Medium | Light. |
| Cellulose triacetate | do | Heavy | do | Negligible | Medium. |
| Creslan poly(acrylonitrile) | Light | V. Heavy | do | do | Negligible. |
| Polyester | Medium | Medium | do | do | Light. |
| Copolymer acrylonitrile and vinyl chloride | V. Heavy | V. Heavy | do | do | Heavy. |
| Nylon | do | do | Heavy | Heavy | Do. |
| Silk | Heavy | Medium | Medium | Medium | Medium. |
| Wool | Medium | Heavy | do | do | Heavy. |

EXAMPLE 2

Plastic chips were immersed in the baths of Example 1 at temperatures of 60–80° C. for 30–60 minutes. The chips were washed and dried.

The relative strengths of the dyeings were visually estimated by comparing color intensities. Results are shown in Table II.

TABLE II

| Plastic | Bath A Compound A | Bath A Compound B | Bath B, Compound A |
|---|---|---|---|
| Cellulose acetate-butyrate | Heavy | Heavy | Heavy. |
| Poly(allyl diglycol carbonate) | Light | | |
| Cellulose acetate | Heavy | | |
| Polystyrene | | | V. Light. |
| Poly(vinyl butyrate) | Heavy | | Heavy. |
| Styrenated polyester | | | Medium. |
| Poly(methyl methacrylate) | | | Heavy. |
| Poly(bisphenol carbonate) | | | V. Light. |
| Polypropylene | | | Medium. |
| Poly(ethylene terephthalate) | | | Light. |

Visual inspection of the dyed chips showed that very little surface distortion had resulted from the dyeing operation.

We claim:

1. A composition of matter suitable for treating polymers so as to render them photochromic
which consists essentially of an aqueous dispersion having a fully water-miscible organic solvent capable of dissolving the hereafter described mercuric complex, a dispersion-forming amount of a surfactant selected from the group consisting of anionic and nonionic surfactants and a mercuric complex represented by the following formulae:

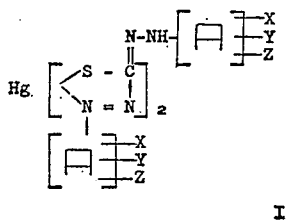

I

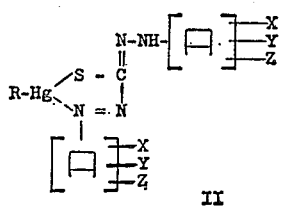

II and

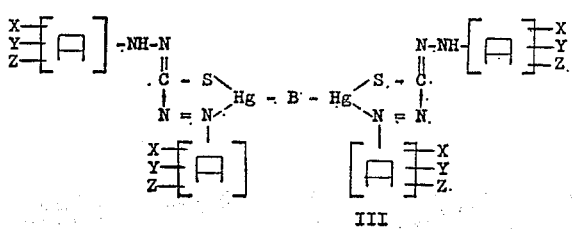

III wherein X, Y and Z are individually selected from the group consisting of lower alkyl, hydroxy, lower alkoxy, halo, nitro, amino and phenylazo; R is a member selected from the group consisting of alkyl of up to eighteen carbons, alkenyl of 2–10 carbon atoms, monocyclic ar(lower alkyl), aryl of up to three six-membered rings, and furyl and pyridyl; the solvent being present in a concentration of about 50–8,000 parts per part of mercuric complex and water being present in a concentration of 50–10,000 parts per part of mercuric complex.

2. The composition of claim 1 wherein both a nonionic and anionic surfactant are employed.

3. The composition of claim 1 wherein the mercuric complex is methyl[(phenylazo)thioformic acid 2-phenyl hydrozidato]mercury.

4. The composition of claim 1 containing between 0.1 and 5.0% by weight of an antioxidant.

5. The composition of claim 1 containing between 0.05 and 5.0% by weight of an ultraviolet light absorber.

6. A process of treating a polymeric material, selected from the group consisting of cellulose esters, poly(acrylonitrile), polyesters, linear super polyamides, poly(allyl diglycol carbonate), vinyl chloride polymers, poly(vinyl butyral) and vinylidene chloride polymers, to render said material photochromic, which comprises immersing said material in an aqueous dispersion as defined in claim 1.

7. The process of claim 6 wherein the mercuric complex is methyl[(phenylazo)thioformic acid 2-phenylhydrazidato]mercury.

8. The process of claim 6 wherein the polymer is cellulose acetate-butyrate.

9. The process of claim 8 wherein the mercuric complex is methyl[(phenylazo)thioformic acid 2-phenylhydrazidato]mercury.

References Cited

UNITED STATES PATENTS

| | | | |
|---|---|---|---|
| 2,735,783 | 2/1956 | Tamblyn et al. | 350—160 X |
| 2,921,407 | 1/1960 | Wagner et al. | 350—160 X |
| 2,976,259 | 3/1961 | Hardy et al. | 252—300 X |
| 3,004,896 | 10/1961 | Heller et al. | 252—300 X |
| 3,275,595 | 9/1966 | Breslow | 260—45.75 |
| 3,361,706 | 1/1968 | Meriwether et al. | 252—300 X |

U.S. Cl. X.R.

96—90; 350—160